US008115819B2

(12) United States Patent
Anderson

(10) Patent No.: US 8,115,819 B2
(45) Date of Patent: Feb. 14, 2012

(54) SYSTEMS AND METHODS FOR CONFIGURING A CAMERA FOR ACCESS ACROSS A NETWORK

(75) Inventor: Ian Anderson, Guildford (GB)

(73) Assignee: Skype Limited, Dublin (IE)

(*) Notice: Subject to any disclaimer, the term of this patent is extended or adjusted under 35 U.S.C. 154(b) by 330 days.

(21) Appl. No.: 12/006,056

(22) Filed: Dec. 28, 2007

(65) Prior Publication Data
US 2008/0231716 A1 Sep. 25, 2008

(30) Foreign Application Priority Data

Mar. 21, 2007 (GB) .................................. 0705431.5

(51) Int. Cl.
*H04N 5/232* (2006.01)
(52) U.S. Cl. ............................... 348/211.1; 348/211.12
(58) Field of Classification Search ............... 348/211.2, 348/211.3, 211.5, 311.2, 211.1, 211.12; 725/25
See application file for complete search history.

(56) References Cited

U.S. PATENT DOCUMENTS

| | | | |
|---|---|---|---|
| 6,698,021 B1* | 2/2004 | Amini et al. .................... 725/105 |
| 7,130,999 B2* | 10/2006 | Yasala et al. .................... 713/157 |
| 7,455,229 B2* | 11/2008 | Tanaka ....................... 235/462.01 |
| 7,478,755 B2* | 1/2009 | Sekiguchi ................. 235/462.24 |
| 7,627,124 B2* | 12/2009 | King et al. ....................... 380/270 |
| 7,909,255 B2* | 3/2011 | Young ....................... 235/462.13 |
| 2003/0059051 A1* | 3/2003 | Hatano et al. ................. 380/270 |
| 2004/0222300 A1* | 11/2004 | Strickland ................. 235/462.15 |
| 2005/0031092 A1 | 2/2005 | Umemura et al. |
| 2005/0120096 A1* | 6/2005 | Rekimoto et al. ............ 709/220 |
| 2005/0282531 A1* | 12/2005 | Andreasson ................... 455/418 |
| 2006/0033811 A1 | 2/2006 | Pulitzer |
| 2006/0135064 A1* | 6/2006 | Cho et al. ...................... 455/41.1 |
| 2006/0259755 A1 | 11/2006 | Kenoyer |
| 2006/0285126 A1* | 12/2006 | Braswell et al. ................ 358/1.1 |
| 2007/0239877 A1* | 10/2007 | Uchida .......................... 709/228 |
| 2008/0111822 A1* | 5/2008 | Horowitz et al. .............. 345/530 |
| 2008/0155667 A1* | 6/2008 | Hamachi ............................ 726/6 |
| 2008/0225119 A1* | 9/2008 | Murata ........................... 348/153 |
| 2008/0250122 A1* | 10/2008 | Zsigmond et al. ............ 709/220 |

FOREIGN PATENT DOCUMENTS

| | | |
|---|---|---|
| JP | 2008229272 A * | 10/2008 |
| WO | WO 01/30068 A1 | 4/2001 |
| WO | WO 2005/009019 A2 | 1/2005 |

OTHER PUBLICATIONS

Lee, M., et al., "Network Accessable Security Web-Based Camera Server System Using Index Search Algorithm," *Info-Tech and Info-Net, IEEE International Conferences*, pp. 60-65 Oct. 2001.
International Search Report for PCT/IB2007/004520, date of mailing Nov. 18, 2008.

* cited by examiner

*Primary Examiner* — Jason Chan
*Assistant Examiner* — Gary C Vieaux
(74) *Attorney, Agent, or Firm* — Hamilton, Brook, Smith & Reynolds, P.C.

(57) ABSTRACT

A camera for connection to an authorised user via a network. The camera has a processor arranged to execute a communications client program and an image data decoding program. The camera further has means for capturing image data including encoded login data, the image data being supplied to the image data decoding program, the image data decoding program being arranged to decode the image data and to supply the login data decoded from the image data to the communication client program to set up the camera as an authorised device accessible by the user via the network.

26 Claims, 3 Drawing Sheets

PRIOR ART

SYSTEMS AND METHODS FOR CONFIGURING A CAMERA FOR ACCESS ACROSS A NETWORK

RELATED APPLICATION

This application claims priority under 35 U.S.C. §119 or 365 to Great Britain, Application No. 0705431.5, filed Mar. 21, 2007. The entire teachings of the above application are incorporated herein by reference.

TECHNICAL FIELD

The present invention relates to connection of a camera to a network for transmitting image data captured by the camera to an authorised user.

BACKGROUND

Cameras which transmit their data using addressed packets via a network are known, and are commonly referred to as web cameras or webcams.

FIG. 1 is a schematic block diagram of the manner in which a webcam is connected to a network such as the Internet. In this arrangement, a camera 2 incorporates a web server 4 and is connected to the network 6 via a wired connection 8 such as an Ethernet or USB connection and modem 9. An appropriate Ethernet or USB port 10 is provided on the camera 2, and the modem 9 is situated at any convenient location on the site where the camera is located. The camera views an image through an image capture device in the form of its lens 12 and supplies that image via the wired connection 8 to an authorised viewer at a user terminal such as a PC 14. The user terminal 14 has a web browser 16 which is connected to the Internet 6 in any suitable manner. A wired connection 18 is shown in FIG. 1 but it will readily be appreciated that a wireless connection could be provided. Images transmitted by the camera 2 via the wired connection 8 and the Internet 6 are received via the connection 18 at the user terminal 14 and can be displayed to be viewed by the authorised user.

However, before this can be done the camera 2 needs to be configured. This can be done using the web browser 16 at the user terminal 14 which identifies the camera 2 and transmits suitable configuration information to the camera to allow it to be set up for access by the user terminal 14. This configuration is done using the web browser 16 in communication with the web server 4.

Increasingly it is desirable to replace the wired connection 8 with a wireless or WIFI connection. Such an arrangement is shown in FIG. 2. In FIG. 2, like reference numerals denote like parts as in FIG. 1. In this arrangement, the wired connection 8 has been replaced by a wireless network (WIFI) 7 between the camera 2 and a wireless access point (WAP) 11. The wireless access point is connected to the Internet 6 via a cable connection (e.g. from a model in the WAP 11. The camera 2 has wireless circuitry 20 for implementing the wireless connection and the wireless access point 11 has similar wireless circuitry 22. The WIFI network 7 is secure and the camera 2 can only access this network after it has been suitably configured and authorised.

In order to allow the camera 2 to be suitably configured, a separate wired connection 24 is provided from the camera 2 to the PC 14. That is, there is still a requirement for a port for example an Ethernet or USB port 10 at the camera and it is necessary to use a port at the user terminal for receiving such an Ethernet or USB connection. The need to provide such a port on the camera together with its corresponding circuitry introduces an overhead into the camera. Moreover, this overhead is required only for configuration purposes. Once the camera has legitimately gained access to the WIFI network, the port 10 and its corresponding connection 24 become redundant unless the camera is moved or the WIFI settings are altered.

SUMMARY

Described embodiments of the present invention obviate the need for such a wired connections for configuration purposes.

According to one aspect of the invention there is provided a camera for connection to a wireless network having: circuitry for establishing a wireless connection with the wireless network in accordance with configuration data; a processor arranged to execute an image data decoding program; and means for capturing image data including encoded configuration data, said image data being supplied to the image data decoding program which is arranged to decode said image data and to supply said configuration data to the circuitry to establish the wire connection.

Another difficulty which arises when setting up a camera 2 in the arrangements of FIGS. 1 and 2 is to allow a viewing program running on the user terminal 14 can connect to the device when firewalls are involved. For example a firewall 26 could be located between the WAP 11 and the Internet or between the PC 14 and the public Internet 6. When configuring the camera 2, considerable user knowledge of firewalls may be needed to ensure that images transmitted from the camera 12 can successfully traverse these firewalls to be viewed at the user terminal 14.

According to another aspect of the invention there is provided a camera for connection to an authorised user via a network having: a processor arranged to execute a communications client program and an image data decoding program; means for capturing image data including encoded login data, said image data being supplied to the image data decoding program, said image data decoding program being arranged to decode said image data and to supply said login data decoded from said image data to the communication client program to set up the camera as an authorised device accessible by the user via the network.

The communications client program can be arranged to transmit data from the camera to the authorised user in the form of addressed packets for example in accordance with a known IP protocol. The communications client can further be arranged to receive the login data and to transmit the login data to a central server which is arranged to transmit an authentication certificate to the camera. That authentication certificate sets up the camera as an authorised device and ensure that only authorised users can access it. That is, only users in possession of the login data which has been used by the camera can access image data received from the camera.

Furthermore, the proprietary protocol can be one which has been set up to traverse firewalls and other obstacles in the network for the purposes of other communications between users.

Another aspect of the invention provides a camera in which the above two useful features are combined. According to this aspect of the invention there is provided a camera for connection to a wireless network having: circuitry for establishing a wireless connection with the wireless network in accordance with configuration data; a processor arranged to execute an image data decoding program and a communication client program; means for capturing image data including encoded login data and configuration data, said image data being supplied to the image data decoding program which is arranged to decode said image data and to supply said login data to the communication client program to set up the camera as an authorised device accessible by a user of the wireless network; and to supply said configuration data to the circuitry to establish the wireless connection.

A still further aspect of the invention provides a system comprising a camera and means for connecting the camera to an authorised user via a network, said camera comprising: a processor arranged to execute a communications client program and an image data decoding program; means for capturing image data including encoded login data, said image data being supplied to the image data decoding program which is arranged to decode said image data and to supply said login data to the communication client program to set up the camera as an authorised device; and wherein said connecting means comprises a configuration program executable by a user terminal and arranged to receive at the user terminal said login data and to generate said image data by encoding the login data and including said encoded login data in said image data.

Another aspect of the invention provides a system comprising a camera and connecting means for connecting the camera to an authorised user via a connection path including a wireless network, the camera having: circuitry for establishing a wireless connection with the wireless network in accordance with configuration data; a processor arranged to execute an image data decoding program; means for capturing image data including encoded configuration data, said image data being supplied to the image data decoding program which is arranged to decode said image data and to supply said configuration data to the circuitry to establish the wireless connection in accordance with the configuration data; and wherein said connecting means comprises a configuration program executable at a user terminal and arranged to receive configuration data enterable by a user at the user terminal and to generate said image data including encoding the configuration data and including the encoded configuration data in the image data.

Another aspect of the invention provides a method of connecting a camera to an authorised user via a network, the method comprising: executing a communications client program and an image data decoding program at the camera; capturing image data including encoded login data, supplying said image data to the image data decoding program which is arranged to decode said image data; and supplying said login data decoded from said image data to the communication client program to set up the camera as an authorised device accessible by the user via the network.

It is possible for the configuration program to generate image data including both encoded login data and encoded configuration data to combine the advantages of both systems.

BRIEF DESCRIPTION OF THE DRAWINGS

For a better understanding of the present invention and to show how the same may be carried into effect, reference will now be made by way of example to FIGS. 3 to 5 of the accompanying drawings, in which.

DETAILED DESCRIPTION

Figure 1:
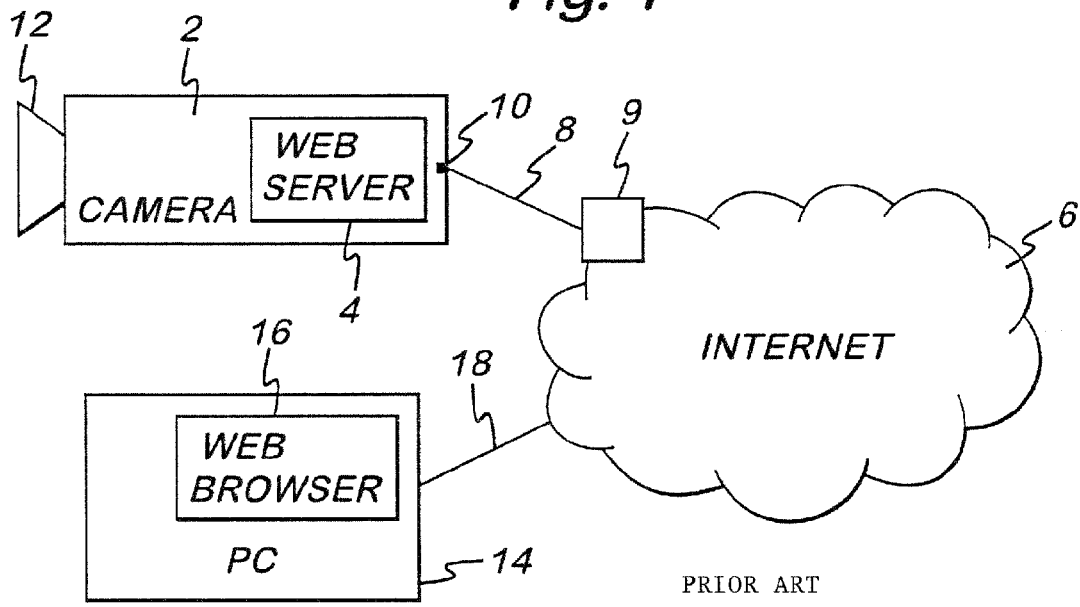
FIG. 1 is a schematic block diagram of the manner in which an existing web camera is connected to a network.
Figure 2:
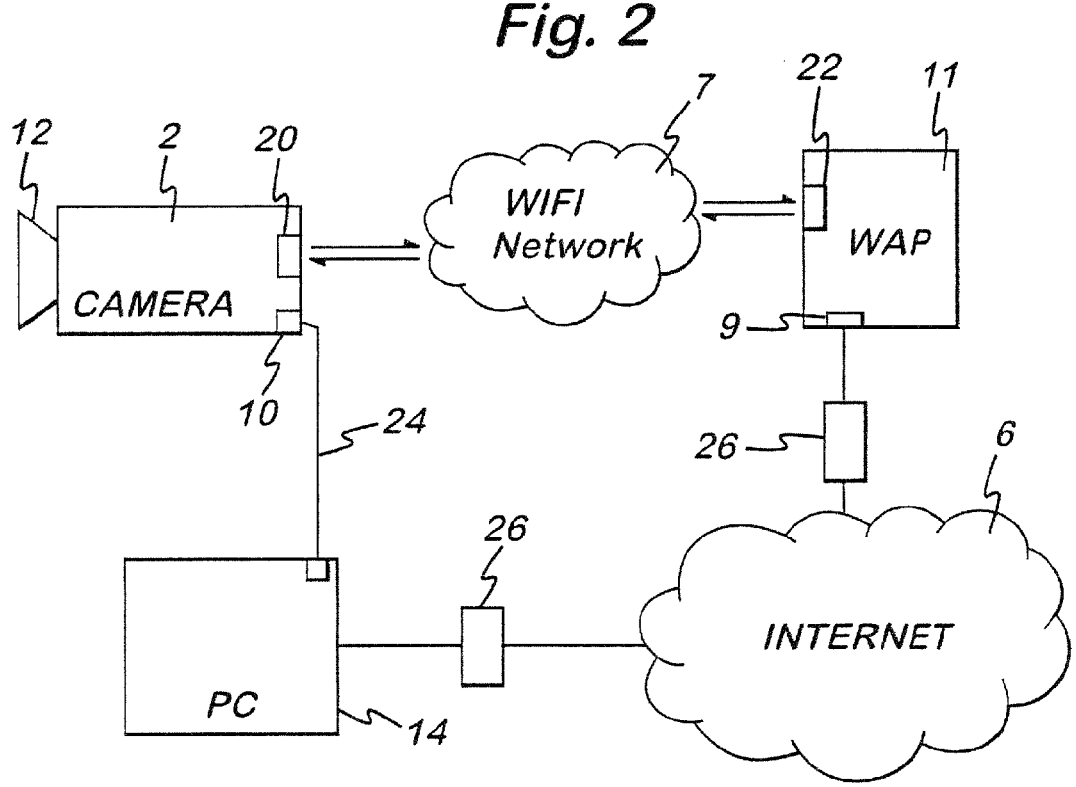
FIG. 2 is a schematic diagram of a web camera connected via a WIFI connection.
Figure 3:
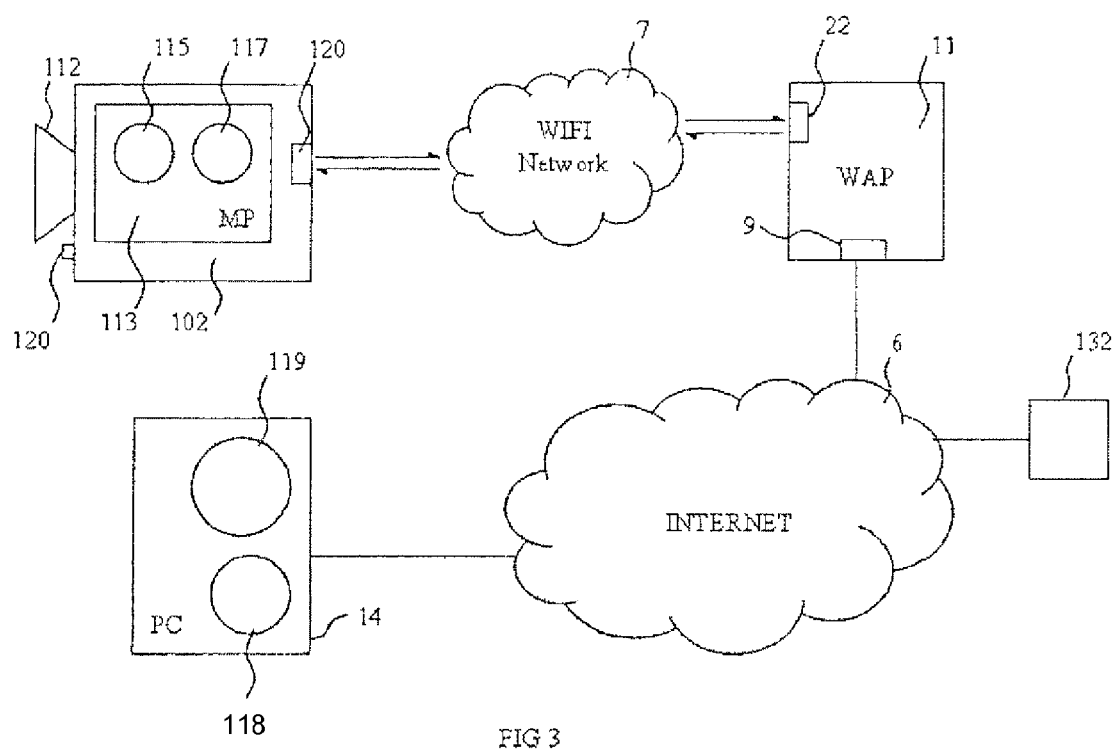
FIG. 3 is a schematic diagram illustrating configuration of a web camera in accordance with one embodiment of invention.

FIG. 3 is a schematic diagram illustrating configuration of a web camera in accordance with one embodiment of the invention. In FIG. 3, a camera 102 has a lens 112 for capturing an image and wireless circuitry 120 for implementing a wireless connection (via a WIFI network 7) with a wireless access point such as that designated by reference numeral 11 in FIG. 2. The camera also includes a processor 113 which is capable of executing an image recognition program 115 and a communications client 117. The camera 102 is supplied as part of a system which includes a configuration program 119 which is executable by the user terminal 14 which is owned by an authorised user of the camera.

Figure 4A:
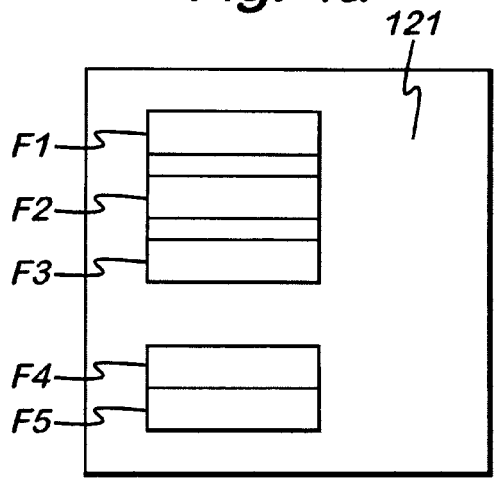
FIG. 4a is a schematic diagram of a display generated by a configuration program.
Figure 4B:
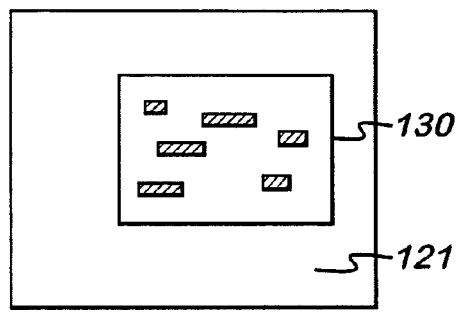
FIG. 4b is a schematic block diagram of image data on a display.

The configuration program 119 which is delivered with the camera 102 queries a user of the user terminal 14 to enter all the necessary setup information for the network. This is done by displaying on a display 121 of the user terminal 14 fields to a user and allowing a user to enter the necessary information. An example of a display 121 is shown in FIG. 4a. Fields F1, F2 and F3 are shown which will be identified for a user and which will allow a user to enter information defining setup and configuration parameters for the camera 102 using known interface techniques, for example a keyboard or a mouse. The configuration program 119 also prompts a user to enter login data including a user name into field F4 and a password into field F5. The login data relates specifically to the communication client 117. After this information has been entered by a user, the configuration program 119 encodes it into image data 130 for display purposes and displays it on the display 121 as shown in FIG. 4b. The preferred format for the image data is a 2D barcode but any suitable format is possible.

Figure 5:
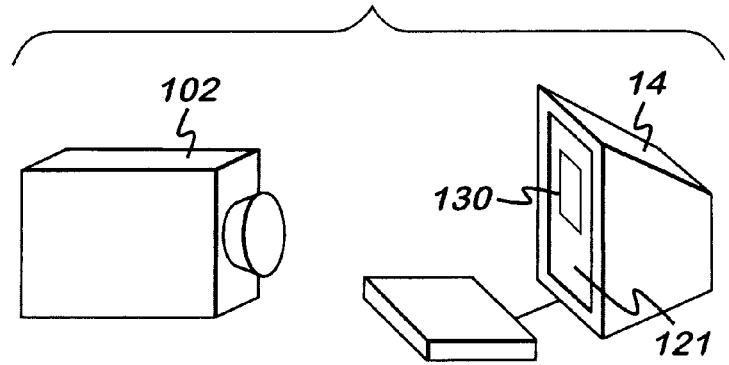
FIG. 5 is a schematic diagram of the arrangement of a camera to receive image data from the display.

Then, as illustrated in FIG. 5, the camera 102 is oriented to capture the image of the barcode 130 from the display 121 of the user terminal 14. Suitable instructions can be supplied to a user with the camera to allow them to do this. The camera 102 executes the image recognition software 115 to capture the image data 130 of the barcode and decodes it. The camera 102 is provided with an indicator 128 such as an audio signal or illumination of an LED to provide feedback to the user to indicate that the image data 130 has been successfully acquired. The login and configuration data derived from the barcode image and decoded by the decoding program 115 is used to configure all the settings for the camera 102. The login name and user password entered for the communications client 117 is used to configure that client so that it can login to a communications server associated with that communications client. The communications server is denoted by reference numeral 132 in FIG. 3. The communications server 132 provides an authentication certificate which can be used by the camera 102 to effect communication events with the user terminal 14 which runs a similar communications client 118 to allow the camera to transmit image data (video data or stills data) to the user terminal 14 via the WIFI network 7 and the Internet 6.

The configuration data which is decoded from the image data is supplied to the circuitry 120 to set up the WIFI connection with the wireless access point 11, especially securing settings such as encryption keys.

Communication of image data from the camera to the authorized user can be implemented in accordance with a communications protocol discussed in WO2005/009019. The user terminal may be, for example, a personal commuter, personal digital assistant, a suitably enabled mobile phone or any other device able to connect to the network. The user terminal executes the communications client 118 which is provided to communicate using a peer-to-peer communications system. The communications client 118 is a software program executable on a local processor in the user terminal 14. The communications client 118 displays to a user of the user terminal 14 a list of contacts with which the user can communicate using the peer-to-peer protocol. In this case, that list of contacts will include the user name allocated to the camera. In order to contact the camera, the user of the user terminal can click on the contact listed for the camera displayed at his display 121. Alternatively, he could type in the user name for the camera. The communications client 118 then sets up a communication event with the camera. Data is transmitted in addressed IP packets in accordance with methods known in the art. It will be clear from the above discussion that the user terminal has already accessed the communications server to receive an authentication certificate to allow it to communicate via the peer-to-peer network with the camera (and indeed with other peer-to-peer users with similar authentication certificates).

The communications server communicates with the client 117 using a proprietary protocol, and not using hypertext transfer protocol (HTTP) message format. This has the effect that on an authorised side of a firewall, a communication exchange can be initiated and responses will be accepted through a firewall that would otherwise block the responses. Therefore, once the camera has been configured as an authorised user of the peer-to-peer network using the login data, image data transmitted from it can traverse firewalls without any special firewall avoidance steps being needed.

In the above description, the camera 102 will transmit image data to the user terminal 14 which is associated with an authorised user. It is a simple matter to add additional recipients who are authorised to receive the image data by transmitting appropriate information via the WIFI network 7. The communications server has the capability to send additional authorization information to the communications client once it has logged in securely. In the case of a peer to peer network, for example, this could be achieved by logging in another device such as a PC, using the same login name and password as the camera, and authorizing additional contacts on that device. The peer to peer network detects the new authorizations, and sends (via a synchronization process) them to other instances of the client logged in with the same username, including the camera.

As an alternative to displaying the image 130 of the barcode to be captured by the camera 102, it can be printed onto a printing medium such as paper and the camera can capture the image from the paper. This allows the camera to be configured in cases where the PC which is going to access the image data from the camera is not readily available in the same location as the camera itself. By printing out the image of the barcode, the printing medium can be conveyed to the location of the camera 102.

It will readily be appreciated that any image which captures the setup data input by a user in a decodable form can be used. A barcode is simply a convenient example of such an image. One possible alternative would be to transmit the information serially to the camera, for example by successively illuminating the display 121 with bit data.

An alternative embodiment of the invention is available for cases where the WIFI network is not secure but where it is still necessary to allow only approved users to receive image data from the camera. According to this embodiment, the camera is not supplied with a configuration program to be executed by a PC, but is supplied with a barcode which encodes a user name and password for the camera. When a camera is purchased by a user, the user uses the camera to capture the barcode image and the communications client 117 receives the user information and password to allow the camera to set itself up as an authorised communications device. The user is also supplied with the user name and password in a human readable form to allow him to enter this information at his PC so that his PC recognises the camera as an authorised communications contact. This option is useful in the situation where no network security information needs to be configured in the camera, which is only the case when the network is not secured. It will be appreciated that the embodiments which require a configuration program can also be used in the case of an insecure network, The configuration program would allow the network details to be left blank, or have an option to specify "use unsecured network".

This has the advantage that cameras can be manufactured on a production line because they are all identical. The "setting up" of the cameras and authorised user can be done after the camera has been purchased by a user.

While this invention has been particularly shown and described with reference to preferred embodiments, it will be understood to those skilled in the art that various changes in form and detail may be made without departing from the scope of the invention as defined by the appendant claims.

What is claimed is:

1. A camera for connection to an authorized user terminal via a network having:
   a communications client and an image data decoder executing on a computer processor;
   the camera configured to capture image data including encoded login data and to supply the image data to the image data decoder;
   the image data decoder configured to decode the image data including the encoded login data and to supply the login data decoded from the image data to the communications client;
   the communications client configured to transmit the login data to a communications server which responds to the transmitted login data by transmitting an authentication certificate to the camera;
   the communications client configured to receive the authentication certificate; and
   the communications client configured to respond to a communication event set up by the user terminal to use the authentication certificate in the communication event to transmit to the user terminal camera data of images received by the camera.

2. A camera according to claim 1, further comprising: circuitry for establishing a wireless connection with a wireless network in accordance with configuration data, said configuration data being included in the image data; and wherein the image data decoder is configured to supply the configuration data to the circuitry to establish the wireless connection.

3. A camera according to claim 1, wherein the camera includes a lens that captures the image data.

4. A camera according to claim 1, wherein said image data is recorded on a medium.

5. A camera according to claim 1, wherein the image data is in the form of a barcode.

6. A camera according to claim 1, wherein said camera data comprises still images.

7. A camera according to claim 1, wherein said camera data comprises video images.

8. A camera according to claim 1, wherein said camera data is in the form of addressed internet protocol packets.

9. A camera according to claim 1, wherein the authorization certificate transmitted by the communications server causes the camera to be configured as an authorized device included in a list of authorized contacts of the network accessible by the user terminal.

10. A camera according to claim 9, wherein the login data for the camera includes a user name and password for the camera to access the network; and the user name is used in the list of authorized contacts of the network to represent the camera contact in the contact list.

11. A camera according to claim 9, wherein the communications client is configured to respond to a selection from the user terminal of the camera contact from the contact list by transmitting to the user terminal camera data of images received by the camera.

12. A camera according to claim 9, wherein the configuration of the camera as an authorized device in the network ensures that only authorized users in the network have access to the camera.

13. A camera according to claim 9, wherein the camera is configured as an authorized device in the network without having to connect to the camera using a wired Ethernet or USB connection.

14. A camera according to claim 9, wherein the images that are transmitted to the user terminal from the camera are transmitted using a peer-to-peer communication protocol.

15. A camera according to claim 14, wherein the contact list at the user terminal is a list of contacts with which the user terminal is configured to communicate using the peer-to-peer communication protocol.

16. A system comprising a camera and means for connecting the camera to an authorized user terminal via a network, said camera comprising:
a communications client and an image data decoder executing on a computer processor;
the camera configured to capture image data including encoded login data and to supply the image data to the image data decoder;
the image data decoder configured to decode the image data including the encoded login data and to supply the login data decoded from the image data to the communications client;
the communications client configured to transmit the login data to a communications server which responds to the transmitted login data by transmitting an authentication certificate to the camera;
the communications client configured to receive the authentication certificate; and
the communications client configured to respond to a communication event set up by the user terminal to use the authentication certificate in the communication event to transmit to the user terminal camera data of images received by the camera,
wherein the means for connecting comprises a configuration application including computer readable instructions executable by a user terminal and arranged to receive at the user terminal the login data and to generate the image data by encoding the login data and including the encoded login data in the image data.

17. A system according to claim 16, further comprising:
circuitry for establishing a wireless connection with a wireless network in accordance with configuration data, said configuration data being included in said image data; and
wherein the image data decoder is configured to supply said configuration data to the circuitry to establish the wireless connection.

18. A system according to claim 16, wherein said image data is displayed at a display of the user terminal.

19. A system according to claim 16, further comprising means for printing the image data generated by the configuration application.

20. A method of connecting a camera to an authorized user terminal via a network, the method comprising:
executing a communications client and an image data decoder at the camera;
capturing image data including encoded login data;
supplying the image data to the image data decoder which is configured to decode the image data; and
supplying the login data decoded from the image data to the communications client;
responsive to receipt of the login data, the communications client accessing a communications server to configure the camera as an authorized device accessible by the user via the network;
the communication server providing an authentication certificate to the camera responsive to the login data
the user terminal setting up a communication event with the camera;
the camera using the authentication certificate in the communication event to transmit camera data of images received by the camera to the user terminal.

21. A method according to claim 20, wherein capturing image data includes capturing image data including configuration data; and
wherein configuration data decoded from the image data by the image data decoder is supplied to circuitry to establish a wireless connection with a wireless network in accordance with the configuration data.

22. A method according to claim 20, further comprising generating the image data by encoding login data which is input at a user terminal into a configuration application executable at the user terminal.

23. A method according to claim 20, further comprising generating the image data by encoding configuration data which is input to a configuration application executable at a user terminal.

24. A camera for connection to a wireless network, the camera having:
circuitry for establishing a wireless connection with the wireless network in accordance with configuration data;
a processor arranged to execute an image data decoder and a communications client;
the image data decoder configured to decode image data including encoded login data and to supply said login data decoded from said image data to the communications client;
the communications client configured to transmit the login data to a communications server, which responds to the transmitted login data by transmitting an authentication certificate to configure the camera as an authorized device included in a list of authorized contacts accessible by a user terminal of the wireless network;
the communication client configured to receive the authentication certificate;

the communication client configured to respond to the receipt of authentication certificate by configuring the camera as an authorized device accessible by the user terminal via the contact list the communications client configured to respond to the authorized device configuration of the camera and to a selection from the user terminal of the camera contact from the contact list by transmitting to the user terminal camera data of images received by the camera.

25. A system for connecting a camera for to an authorized user terminal via a network comprising:

a network including a camera, an authorized user terminal and a communication server;

the camera including a computer processor configured to execute a communications client and an image data decoder;

the camera configured to capture image data including encoded login data and to supply the image data to the image data decoder;

the image data decoder configured to decode the image data including the encoded login data and to supply the decoded login data to the communications client;

the communications client configured to transmit the decoded login data to the communications server;

the communications server configured to respond to the transmitted login data by transmitting an authentication certificate to configure the camera as an authorized device included in a list of authorized contacts accessible by the user terminal via the network;

the communication client configured to receive the authentication certificate;

the communication client configured to respond to the receipt of the authentication certificate by configuring the camera as an authorized device accessible by the user terminal via the contact list; and the user terminal selecting the camera contact in the contact list;

the communications client configured to respond to the camera configured as an authorized device and to the selection, by the user terminal, of the camera contact in the contact list by transmitting to the user terminal camera data of images received by the camera.

26. A method of connecting a camera to an authorized user terminal via a network, the method comprising:

executing a communications client and an image data decoder at the camera;

capturing image data including encoded login data;

supplying the image data to the image data decoder which is configured to decode the image data;

supplying the login data decoded from the image data to the communications client;

responsive to receipt of the decoded login data, accessing a communications server to configure the camera as an authorized device accessible by a user terminal and using the decoded login data, configuring allocating a user name for the camera;

responsive to the allocation of the user name for the camera, causing the camera to appear as a contact in a contact list at the user terminal; and responsive to a selection of the camera contact, transmitting camera data of images received by the camera to the user terminal.

* * * * *

UNITED STATES PATENT AND TRADEMARK OFFICE
CERTIFICATE OF CORRECTION

PATENT NO. : 8,115,819 B2  Page 1 of 1
APPLICATION NO. : 12/006056
DATED : February 14, 2012
INVENTOR(S) : Ian Anderson It is certified that error appears in the above-identified patent and that said Letters Patent is hereby corrected as shown below:

IN THE CLAIMS:

In Column 8, Claim 20, line 29 insert -- ; -- after "data"
In Column 9, Claim 24, line 4, insert -- ; -- after "list"
In Column 9, Claim 25, line 10, delete "for" after "camera"
In Column 10, Claim 26, line 24, delete "allocating" after "configuring"

Signed and Sealed this
Seventeenth Day of April, 2012

David J. Kappos
*Director of the United States Patent and Trademark Office*